United States Patent
De Domenico et al.

(10) Patent No.: US 10,652,906 B2
(45) Date of Patent: May 12, 2020

(54) METHOD FOR DISTRIBUTING A LOAD IN A MULTI RADIO ACCESS TECHNOLOGY HETEROGENEOUS NETWORK

(71) Applicant: COMMISSARIAT A L'ENERGIE ATOMIQUE ET AUX ENERGIES ALTERNATIVES, Paris (FR)

(72) Inventors: Antonio De Domenico, Grenoble (FR); Gourab Ghatak, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 1 day.

(21) Appl. No.: 16/117,298

(22) Filed: Aug. 30, 2018

(65) Prior Publication Data

US 2019/0075570 A1    Mar. 7, 2019

(30) Foreign Application Priority Data

Sep. 1, 2017    (FR) ..................................... 17 58112

(51) Int. Cl.
| | | |
|---|---|---|
| H04W 72/08 | (2009.01) | |
| H04W 28/08 | (2009.01) | |
| H04W 16/08 | (2009.01) | |
| H04L 12/24 | (2006.01) | |
| H04W 72/04 | (2009.01) | |
| H04W 88/08 | (2009.01) | |

(52) U.S. Cl.
CPC ......... *H04W 72/085* (2013.01); *H04L 41/142* (2013.01); *H04W 16/08* (2013.01); *H04W 28/08* (2013.01); *H04W 72/0453* (2013.01); *H04W 88/08* (2013.01)

(58) Field of Classification Search
CPC ............ H04L 41/142; H04W 72/0453; H04W 72/085; H04W 28/08; H04W 16/08
See application file for complete search history.

(56) References Cited

U.S. PATENT DOCUMENTS 9,775,068 B2 * 9/2017 Fehske .................. H04W 16/18
10,419,080 B2 * 9/2019 Liang .................. H04B 7/0417
(Continued)

OTHER PUBLICATIONS

French Preliminary Search Report dated Apr. 25, 2018 in French Application 17 58112 filed Sep. 1, 2017 (with English Translation of Categories of Cited Documents).

(Continued)

*Primary Examiner* — Redentor Pasia
(74) *Attorney, Agent, or Firm* — Oblon, McClelland, Maier & Neustadt, L.L.P.

(57) ABSTRACT

A method for distributing the traffic load in a multi radio access technology heterogeneous network, the network including macrocells operating in a first sub-6 GHz band, and minicells that can operate in the sub-6 GHz band and in a millimeter band. The distribution of the traffic is carried out with an association strategy that calls upon, on the first hand, a first bias ($Q_T$) in order to favour the association with the base stations of the minicells/macrocells and a second bias ($Q_R$) in order to favour the use of the millimeter/sub-6 GHz band when the terminal is associated with a base station SBS of a minicell.

13 Claims, 4 Drawing Sheets

(56) References Cited

U.S. PATENT DOCUMENTS

| | | | |
|---|---|---|---|
| 2016/0073287 A1 | 3/2016 | Himayat et al. | |
| 2017/0353260 A1* | 12/2017 | Wang | H04J 3/1694 |
| 2018/0219664 A1* | 8/2018 | Guo | H04W 24/10 |
| 2018/0220340 A1* | 8/2018 | Ramachandra | H04W 36/0094 |
| 2019/0059013 A1* | 2/2019 | Rahman | H04L 1/00 |
| 2019/0158321 A1* | 5/2019 | Liu | H04W 8/08 |
| 2019/0288750 A1* | 9/2019 | Nagaraja | H04W 56/0065 |

OTHER PUBLICATIONS

Sarabjot Singh, et al., "Offloading in Heterogeneous Networks: Modeling, Analysis, and Design Insights," IEEE Transactions on Wireless Communications, vol. 12, No. 5, May 2013, pp. 2484-2497.

Sarabjot Singh, et al. "Downlink Rate Distribution in Multi-RAT Heterogeneous Networks," IEEE ICC 2013—Wireless Communications Symposium, pp. 5188-5193.

Tianyang Bai, et al., "Coverage and Rate Analysis for Millimeter Wave Cellular Networks," Mar. 2014, pp. 1-33.

Hesham Elsawy, et al., "Stochastic Geometry for Modeling, Analysis and Design of Multi-Tier and Cognitive Cellular Wireless Networks: A Survey," IEEE Communications Surveys & Tutorials, vol. 15, No. 3, Third Quarter 2013, pp. 996-1019.

\* cited by examiner

METHOD FOR DISTRIBUTING A LOAD IN A MULTI RADIO ACCESS TECHNOLOGY HETEROGENEOUS NETWORK

TECHNICAL FIELD

This invention generally relates to the field of multi radio access technology heterogeneous cellular networks, and more particularly a method for distributing the traffic load in these networks.

PRIOR ART

Heterogeneous cellular telecommunication networks or HetNets represent one of the most promising solutions for the development of the next generation of mobile telephones (5G). Generally, a heterogeneous cellular network is comprised of several tiers of cells: macrocells and small cells such as femtocells and picocells. A multi technology or multi-RAT cellular network (multi Radio Access Technology) is comprised of networks using different radio access technologies, for example Wi-Fi and 3G, with these networks able to use different frequency bands.

We shall consider in what follows multi radio access technology heterogeneous cellular networks (multi-RAT HetNets). A representative example of such a network is comprised of two layers of cells: a first layer of cells comprises macro-cells operating in the hyperfrequency range below 6 GHz (band referred to hereinafter as sub-6 GHz). The macro-cells are served by base stations, designated by MBSs (Macro Base Stations). To this first layer of cells is added a second layer comprised of small cells operating both in the sub-6 GHz range and in the millimeter range (25 GHz-300 GHz). The small cells are served by base stations designated by multi-RAT SBSs (multi Radio Access Technology Small Base Stations).

Although base stations MBSs of the conventional network provide a continuous coverage to users, the multi-RAT base stations SBSs make it possible to provide high speeds by jointly exploiting the sub-6 GHz and millimeter bands.

In the conventional HetNets networks (i.e. single technology), use is made of offloading mechanisms from the base stations MBSs of the macrocells to the base stations SBSs of small cells. Such an offloading mechanism, known under the acronym of CRE (Cell Range Expansion), consists in adding a positive bias to the power of the signal received from the base station SBS before comparing it with the power of the signal received by the base station MBS. Thus, for an equal receiving power, the mobile terminal is associated with a base station SBS rather than with a base station MBS. It has been able to be shown that, in the conventional HetNets networks, the aforementioned mechanism leads on the average to a degradation of the signal to noise and interference ratio or SNIR (Signal to Noise and Interference Ratio) at the terminal side.

In the multi-RAT HetNets networks, the strategy of distributing the traffic load between MBSs and SBSs is more complex. As such for example, when the stations SBSs operate in a band of the sub-6 GHz range and in the millimeter band, it is necessary to take account of the path loss and of the sensitivity to the situations of blockage in the millimeter band. In certain cases it has been able to be shown that the offloading mechanism made it possible to improve the SINR, since the high path loss and the directivity of the antennas of the stations SBSs reduce the level of interference received by the terminal.

The purpose of this invention is to propose a method for distributing loads in a multi radio access technology heterogeneous cellular network, in particular a network in which the base stations (SBSs) of the small cells operate both in a band of the sub-6 GHz range and in the millimeter band, said method making it possible to select the level of association (MBS or SBS) and the radio access technology (sub-6 GHz band from 0.7 to 6 GHz or millimeter band from 25 to 300 GHz) in such a way as to maximise the level of SINR on the terminals.

DISCLOSURE OF THE INVENTION

This invention is defined by a method for distributing traffic loads in a multi radio access technology heterogeneous network, said network comprising macrocells served by base stations of a first tier of the network, referred to as MBSs, operating in a first frequency band, and minicells served by second base stations of a second tier of the network, referred to as SBS, suitable for operating in said first frequency band and in a second frequency band, separate from the first frequency band, wherein the coverage parameters of said network are acquired or measured;

from the coverage parameters of said network, an optimum pair of bias values ($Q_T^{opt}, Q_R^{opt}$) is determined that maximises the coverage probability, $P_c(\gamma)$, defined as the probability that the signal to noise and interference ratio on a terminal is on the average greater than a predetermined threshold ($\gamma$) in the deployment zone of said network;

a base station MBS is associated with the terminal, if the strongest power received from a base station MBS in the first frequency band is greater, than the strongest power received from a station SBS in this same frequency band, corrected by the first bias value ($Q_T^{opt}$), the association then being carried out in the first frequency band; and otherwise, the base station SBS with the strongest power received by the terminal in the first frequency band is associated with the terminal, the association being carried out in the first frequency band if this power is greater than the power received by the terminal in the second frequency band, corrected by the second bias value, and the association being carried out in the second frequency band in the opposite case.

For example, the first frequency band is a sub-6 GHz band from 0.7 to 6 GHz and the second frequency band is a millimeter band from 25 GHz to 300 GHz.

Advantageously, the pair of the coverage probability, $P_c(\gamma)$, is calculated from $$P_c(\gamma) = \sum_{\substack{t \in \{M,S\} \\ v \in \{L,N\} \\ r \in \{\mu,m\}, t=S}} P(SINR > \gamma \mid t, v, r) P_{tvr}$$

where $P_{tvr}$ is the probability of association of the terminal with a base station of tier t, in conditions of visibility v and in frequency band r, and where $P(SINR > \gamma \mid t, v, r)$ is the conditional probability that the signal to noise and interference ratio on the terminal exceeds said predetermined threshold, $\gamma$.

According to a first alternative, the probability of association of the terminal with a base station of tier t, in conditions of visibility v and in frequency band r is calculated by means of $P_{tvr}=P_{tv}P_{vr}$ where $P_{tv}$ is the probability of association of the terminal with a base station of tier t, in conditions of visibility v and $P_{vr}$ is the probability of association of the terminal with a station SBS of visibility $P_{vr}$ in the frequency band r.

According to a second alternative, the probability $P_{tv}$ is calculated by means of:

$$P_{ML} = W_1 \exp(-\pi\lambda_M d_M^2)\exp(-\pi\lambda_S d_S^2) + \exp(-\pi\lambda_M d_M^2)(1-\exp(-\pi\lambda_S d_S^2))$$

for an association with a base station MBS in a state of visibility LOS, $$P_{MN} = W_2(1-\exp(-\pi\lambda_M d_M^2))(1-\exp(-\pi\lambda_S d_S^2))$$

for an association with a base station MBS in a state of visibility NLOS, $$P_{SL} = (1-W_1)\exp(-\pi\lambda_M d_M^2)\exp(-\pi\lambda_S d_S^2) + \exp(-\pi\lambda_S d_S^2)(1-\exp(-\pi\lambda_M d_M^2))$$

for an association with a base station SBS in a state of visibility LOS, and $$P_{SN} = (1-W_2)(1-\exp(-\pi\lambda_M d_M^2))(1-\exp(-\pi\lambda_S d_S^2))$$

for an association with a base station SBS in a state of visibility NLOS, $d_M$ is a characteristic distance beyond which a base station MBS is in a state of visibility LOS and beyond which it is in a state of visibility NLOS, $d_S$ is a characteristic distance beyond which a base station SBS is in a state of visibility LOS and beyond which it is in a state of visibility NLOS, $\lambda_M$ and $\lambda_S$ are intensities of Poisson distributions giving respectively the spatial distribution of base stations MBS and that of base stations SBS, $W_1$ and $W_2$ are coefficients that depend on the transmitting powers of the base stations MBS and SBS as well as a first bias value $Q_T$ used for the selection of the tier t of the base station.

According to a third alternative, the probability $P_{vr}$ is calculated by $$P_{v\mu} = \exp\left(-\pi\lambda_S \left(\frac{K_{Svm}G_0 Q_R}{K_{Sv\mu}}\right)^{\frac{2}{\alpha_{Svm}-\alpha_{Sv\mu}}}\right)$$

for an association with a base station SBS in the sub-6 GHz band and $P_{vm}=1-P_{v\mu}$ for an association with a station SBS in the millimeter band, where $K_{Svm}$ and $K_{Sv\mu}$ are respectively the respective path loss constants for the millimeter band and the sub-6 GHz band in a state of visibility v, $\alpha_{Svm}$ and $\alpha_{Sv\mu}$ are the respective path loss exponents for the millimeter band and the sub-6 GHz band in a state of visibility v, $G_0$ is the antenna gain, $\lambda_S$ is the intensity of a Poisson distribution giving the spatial distribution of the base stations SBS, and $Q_R$ is a second bias value used for the selection of the frequency band in the association of the terminal with a base station SBS.

In any case, the conditional probability $P(SINR>\gamma|t,v,\mu)$ that the signal to noise and interference ratio on the terminal exceeds said predetermined threshold, knowing that the terminal is associated with a base station of tier t, of state of visibility v, operating in the sub-6 GHz band, can be obtained from the probability density of the base station of tier t, of state of visibility v and of the strongest power received, as well as the measurement of the power received from this base station.

Alternatively, the conditional probability $P(SINR>\gamma|S,v,m)$ that the signal to noise and interference ratio on the terminal exceeds said predetermined threshold, knowing that the terminal is associated with a base station SBS, of state of visibility v, operating in the millimeter band, can be obtained from the probability density of the base station SBS of the strongest power, of the power received from this base station, antenna gains of the terminal and of this base station as well as angular widths of the main lobes of radiation of the terminal and of the base station.

The coverage probability is advantageously calculated as a function $P_c(\gamma)=F(G_0,Q_T,Q_R)$ where $G_0$ is the antenna gain, product of the receiving antenna gain of the terminal and of the transmitting antenna gain of a station SBS, and $Q_T, Q_R$ are said first and second bias values.

The optimum pair of bias values $(Q_T^{opt}, Q_R^{opt})$ can be obtained by systematically sweeping the Cartesian product $S_{QT} \times S_{QR}$ where $S_{QT}$ is a set of first possible bias values and $S_{QR}$ is a set of second possible bias values and by searching for the pair of first and second bias values that maximises the function $F(G_0,Q_T,Q_R)$.

Alternatively, the optimum pair of bias values $(Q_T^{opt}, Q_R^{opt})$ can be obtained by calculating $$Q_R^{opt} = \frac{E\left[\frac{S_m}{I_m + \sigma_{N,m}^2}\right]}{E\left[\frac{S_\mu}{I_\mu + \sigma_{N,\mu}^2}\right]} \text{ where } \frac{S_m}{I_m + \sigma_{N,m}^2}$$

is the signal to noise ratio on the terminal in the millimeter band, $$\frac{S_\mu}{I_\mu + \sigma_{N,\mu}^2}$$

is the signal to noise ratio on the terminal in the sub-6 GHz band and E[.] is the mathematical expectation taken over all of the possible positions of the terminal with respect to the base stations of the network.

Alternatively encore, if the base stations SBS operate only in the millimeter band, the optimum pair of bias values $(Q_T^{opt}, Q_R^{opt})$ can be obtained by the gradient method.

In any case, in order to transfer a terminal associated with a base station SBS, from the sub-6 GHz band to the millimeter band, the antenna gain of the terminal, $G_{RX,m}^{UE}$, in the millimeter band, can be increased in such a way that $$G_{RX,m}^{UE} = \frac{G_{RX,\mu}^{UE} G_{TX,\mu}^{SBS}}{G_{TX,m}^{SBS}} \left(\frac{K_{SL\mu} \cdot P_{SL\mu}}{K_{SLm} \cdot P_{SLm}}\right) d^{(\alpha_{SLm}-\alpha_{SL\mu})}$$

where $G_{RX,\mu}^{UE}$ is the antenna gain of the terminal in the sub-6 GHz band, $G_{TX,\mu}^{SBS}$ and $G_{TX,m}^{SBS}$ are the antenna gains of the base station SBS associated with the terminal, respectively in the sub-6 GHz band and in the millimeter band, $K_{SL\mu}$ and $K_{SLm}$ are respectively the path loss constants in the sub-6 GHz band and in the millimeter band, $P_{SL\mu}$ and $P_{SLm}$ are respectively the powers transmitted by the base station SBS in the sub-6 GHz band and in the millimeter band, $\alpha_{SL\mu}$ and $\alpha_{SLm}$ are respectively the path loss exponents in the sub-6 GHz band and in the millimeter band, for the direct propagation path between the base station SBS associated with the terminal, and d is the distance between this base station and the terminal.

BRIEF DESCRIPTION OF THE DRAWINGS

Other features and advantages of the invention shall appear when reading a preferred embodiment of the invention, given in reference to the accompanying figures among which.

DETAILED DESCRIPTION OF PARTICULAR EMBODIMENTS

It shall be considered in what follows a multi radio access technology heterogeneous cellular network. Without loss of generality, it shall be supposed that the network comprises two types of cells: macrocells (served by base stations MBSs) operating in the sub-6 GHz band (i.e. from 0.7 to 6 GHz) and minicells, also referred to as small cells, (served by base stations SBSs) operating both in this sub-6 GHz band (or in a band that is not separate from the latter) and in the millimeter band (25 to 300 GHz).

The principle at the base of the invention is to use a first bias value, $Q_T$, in order to select the cell tier (macrocell or minicell) that will serve the terminal and a second bias value, $Q_R$, in order to select the radio access technology in the case where the terminal is located in a coverage zone of a minicell.

Figure 1:
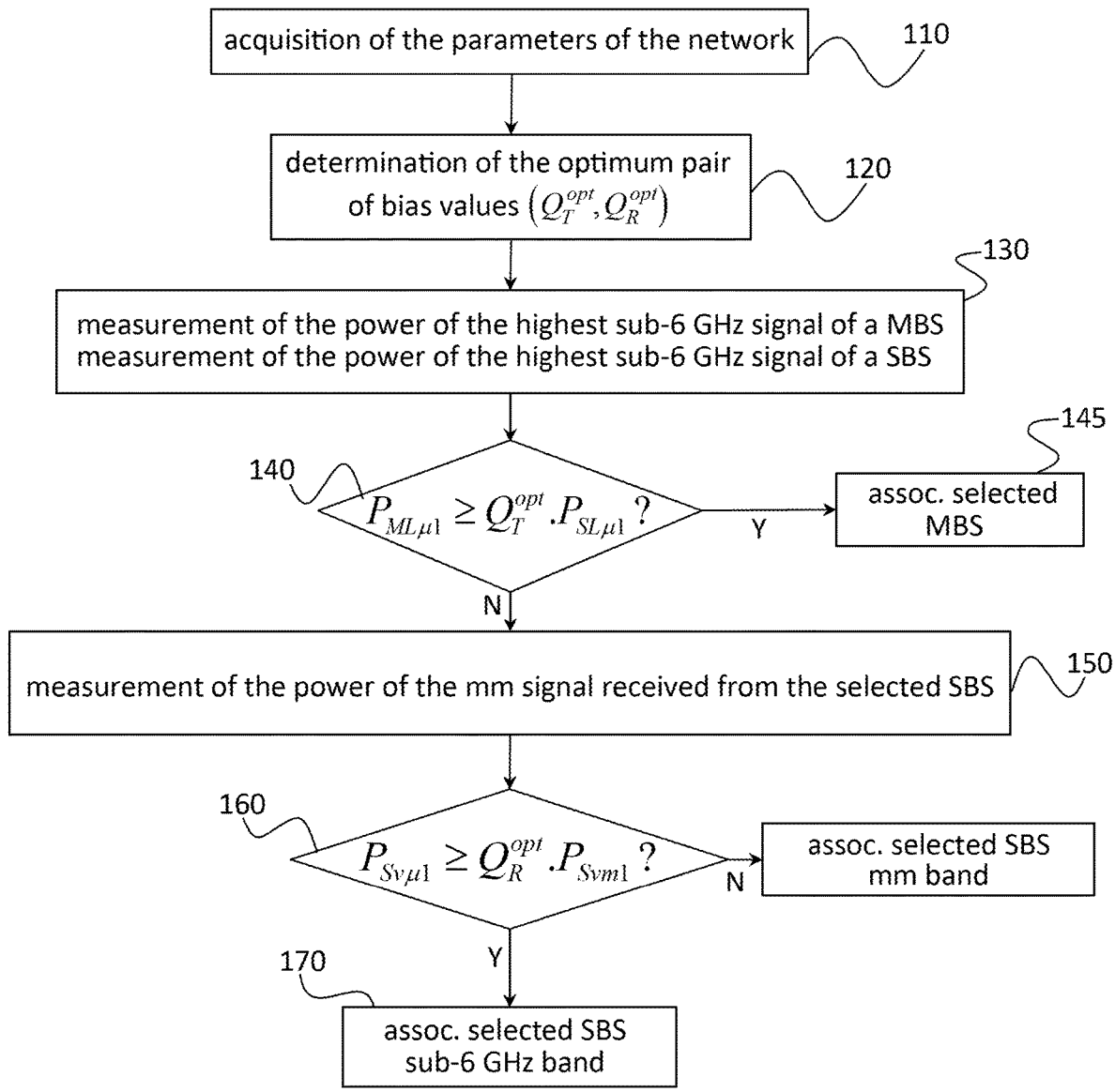
FIG. 1 diagrammatically shows the flowchart of a method for distributing loads in a multi radio access technology heterogeneous cellular network, according to an embodiment of the invention.

More precisely, FIG. 1 diagrammatically shows the flowchart of a method for distributing loads in a multi technology heterogeneous cellular network, according to an embodiment of the invention.

In a first step, 110, the coverage parameters of the network are acquired or are measured. These parameters are for example the parameters of the statistical distribution of the base stations MBSs and SBSs in the zone covered by the network, the transmitting powers of the base stations MBSs and SBSs, the exponents and the coefficients of the laws of path losses LOS and NLOS, the bandwidths respectively used for the transmission in sub-6 GHz band and for the transmission in millimeter band, the respective noise densities in these two bands, the average propagation distances LOS in these two bands. Recall that a propagation LOS (Line Of Sight) corresponds to the case where the base station is in a direct line of sight and a propagation NLOS (Non Line Of Sight) otherwise.

In a second step, 120, an optimum pair of bias values $Q_T$ and $Q_R$ is determined according to the parameters of the network, as exposed further on. This step can be carried out once and for all or at each modification of the parameters of the cellular network. The optimum bias values, noted as $Q_T^{opt}$ and $Q_R^{opt}$ apply to the entire network.

We then pass to the phase of association itself, executed each time a terminal wants to access the network.

In the step 130, the terminal measures the power of the control signal of the base stations MBSs. In what follows, respectively $P_{M\mu1}$ denotes the highest signal power received from a base station MBS. Similarly, $P_{S\mu1}$ is respectively the measurement of the highest signal received from a base station SBS.

It is sought whether a base station (MBS) of a macrocell (choice of the first tier) can be associated with the terminal. To do this, it is first tested in 140 if:

$$P_{M\mu1} \geq Q_T^{opt} P_{S\mu1} \quad (1)$$

If the condition (1) is satisfied, in 145 the terminal is associated with the station MBS corresponding to the strongest signal received. In other terms, a station MBS is associated with the terminal, if there is at least one station MBS and if the strongest power received from such a station in the sub-6 GHz band is greater, by a factor $Q_T^{opt}$, than the highest power received from a station SBS in this same band. $MBS_{max}$ (resp. $SBS_{max}$) denote the base station MBS (resp. SBS) corresponding to the strongest power received by the terminal in the sub-6 GHz band in question. Thus $P_{M\mu1}$ is the power received from $MBS_{max}$ in the sub-6 GHz band and $P_{S\mu1}$ is the power received from $SBS_{max}$ in this band.

If the condition (1) is not fulfilled, in 150 the signal power of the base station $SBS_{max}$ is measured in the millimeter band, which is $P_{Sm1}$, then in 160 it is tested if:

$$P_{S\mu1} \geq Q_R^{opt} P_{Sm1} \quad (2)$$

If the condition (2) is fulfilled, the terminal is associated with the station $SBS_{max}$ in the sub-6 GHz band. Otherwise, if the condition (2) is not satisfied, the same station $SBS_{max}$ is associated with the terminal but in the millimeter band, in 170.

Figure 2:
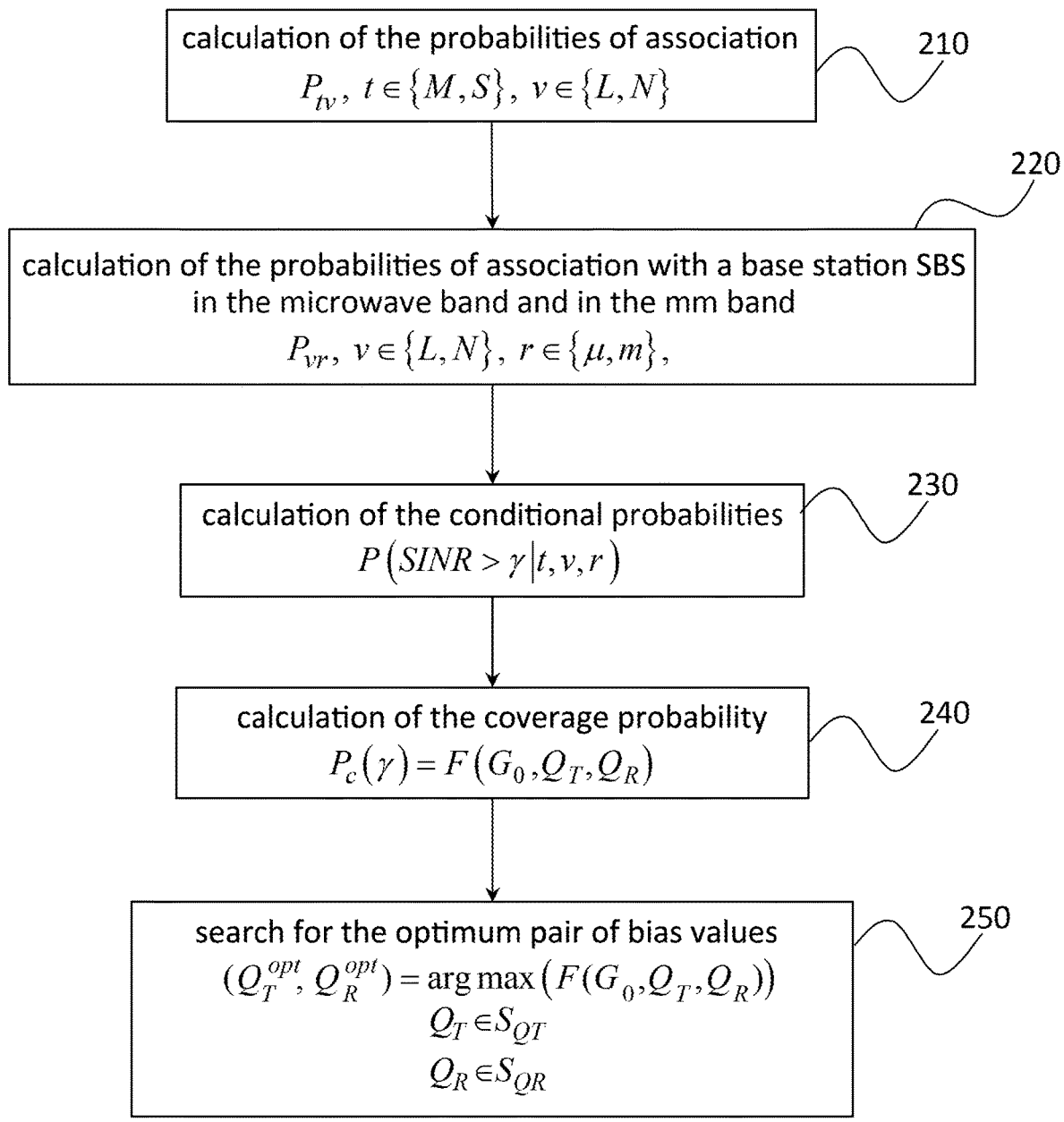
FIG. 2 diagrammatically shows the flowchart of a method of calculating an optimum pair of bias values in a step of the FIG. 1.

FIG. 2 diagrammatically shows the flowchart of a method for calculating the optical pair of bias values in the step 120 of the FIG. 1.

This method of calculation calls upon the parameters of the network as detailed hereinafter. It aims to maximise the coverage probability, defined as the probability that the signal to noise and interference ratio on a terminal is, on the average, greater than a predetermined value γ. The average is taken over all of the possible relative positions of the terminal with respect to the base stations deployed in the zone.

More precisely if $P_{tvr}$ denotes the probability of association of a terminal UE (User Equipment) with a base station of tier t (t=M for the macrocellular tier and t=S for the minicellular tier), in conditions of visibility v (v=L in conditions of LOS and v=N in conditions of NLOS) and with the radio access technology r (r=µ for the sub-6 GHz band and r=m for the millimeter band), the coverage probability $P_c(\gamma)$ relative to a level of SINR greater than γ, can be expressed in the form:

$$P_c(\gamma) = P(SINR > \gamma) = \sum_{\substack{t \in \{M,S\} \\ v \in \{L,N\} \\ r \in \{\mu,m\}, t=S}} P(SINR > \gamma \mid t, v, r) P_{tvr} \quad (3)$$

where P(SINR>γ|t,v,r) is the probability that the level of SINR on the terminal in an association configuration t,v,r is greater than γ. Note that all of the triplets whereon the summing (3) is carried out do not contain all of the triplets (t,v,r) since the choice of the radio access technology is possible only in the case of an association with an SBS.

In a first step, 210, the probabilities of association are calculated of a terminal with a base station MBS and a base station SBS in the states of visibility LOS and NLOS, is $P_{tv}$, $t \in \{M,S\}$, $v \in \{L,N\}$.

This probability of association depends, on the one hand, on the distance of the terminal to a base station and, on the other hand, of the state of visibility of the base station in question.

If the positions of the different base stations are known, it can be supposed that the position of the terminal obeys a uniform law of spatial distribution.

On the other hand, if the positions of the different base stations are not known, it can be supposed that the positions of the base stations MBS and SBS follow a one-off Poisson stochastic process in the zone involved. $\lambda_M$ and $\lambda_S$ respectively denote the two-dimensional distribution densities of the one-off Poisson process for the stations MBS and SBS.

Regarding the states of visibility LOS and NLOS, it is supposed that they follow an LOS ball model, such as described for example in the article by T. Bai at al. entitled "Coverage and rate analysis for millimeter-wave cellular networks", IEEE Trans. Wireless Comm. vol. 13, no. 2, pp. 1100-1114, 2015. According to this model, if the terminal is located at a distance less than a characteristic distance $d_M$ (resp. $d_S$) from a base station MBS (resp. SBS), the base station will be supposed as being in direct line of site (LOS) of the terminal. Otherwise, the state of visibility will be considered as being NLOS.

The probabilities of association with a base station MBS or SBS, in a state of visibility LOS or NLOS, noted as $P_{tv}$ with $t \in \{M,S\}$ and $v \in \{L,N\}$, are respectively given by:

$$P_{ML} = W_1 \exp(-\pi\lambda_M d_M^2)\exp(-\pi\lambda_S d_S^2) + \exp(-\pi\lambda_M d_M^2)(1-\exp(-\pi\lambda_S d_S^2)) \quad (4\text{-}1)$$

$$P_{MN} = W_2(1-\exp(-\pi\lambda_M d_M^2))(1-\exp(-\pi\lambda_S d_S^2)) \quad (4\text{-}2)$$

$$P_{SL} = (1-W_1)\exp(-\pi\lambda_M d_M^2)\exp(-\pi\lambda_S d_S^2) + \exp(-\pi\lambda_S d_S^2)(1-\exp(-\pi\lambda_M d_M^2)) \quad (4\text{-}3)$$

$$P_{SN} = (1-W_2)(1-\exp(-\pi\lambda_M d_M^2))(1-\exp(-\pi\lambda_S d_S^2)) \quad (4\text{-}4)$$

where $W_1$ is the probability that the terminal is associated with a station MBS in the case where a base station MBS and a base station SBS are in a state of visibility LOS with respect to the terminal, and where $W_2$ is the probability that the terminal is associated with a station MBS in the case where a base station MBS and a base station SBS are in a state of visibility NLOS with respect to the terminal. The analytical expressions of $W_1$ and $W_2$ are given in the appendix. They depend in particular on the respective transmitting powers, $P_M$ and $P_S$ of the base stations MBS and SBS, on the bias $Q_T$ introduced for the selection of the tier, as well as on the characteristics of the propagation paths between the base station MBS and the terminal, on the one hand, and of the base station SBS and the terminal, on the other hand.

In a second step, 220, the probability is calculated that, when a terminal is associated with a base station SBS, in the state of visibility LOS or NLOS, it is as such in the sub-6 GHz band or in the millimeter band.

More precisely, the probability $P_{v\mu}$ that the terminal is associated with the base station SBS in the state of visibility v via the sub-6 GHz band is given by:

$$P_{v\mu} = \exp\left(-\pi\lambda_S\left(\frac{K_{Svm}G_0Q_R}{K_{Sv\mu}}\right)^{\frac{2}{\alpha_{Svm}-\alpha_{Sv\mu}}}\right) \quad (5\text{-}1)$$

and, consequently, the probability $P_{vm}$ that the terminal is associated with the base station SBS in the state of visibility v via the millimeter band is given by:

$$P_{vm} = 1 - P_{v\mu} \quad (5\text{-}2)$$

where $G_0$ is the antenna gain in the millimeter band, i.e. the product of the transmitting antenna gain of the base station SBS and of the receiving antenna gain of the terminal UE in this band (the antenna gain is assumed to be equal to 1 in the sub-6 GHz band, the transmitting and receiving antennas in this band able to be considered as practically omnidirectional), $K_{Svm}$ and $K_{Sv\mu}$ are respectively the path loss constants for the millimeter band and for the sub-6 GHz band, $\alpha_{Svm}$ and $\alpha_{Sv\mu}$ are respectively the path loss exponents for the millimeter band and for the sub-6 GHz band. In a logarithmic path loss model, the path loss coefficients in these two bands are given by:

$$\eta_{Svm}(\text{dB}) = K_{Svm} + 10\alpha_{Svm}\log_{10}(d) \quad (6\text{-}1)$$

$$\eta_{Sv\mu}(\text{dB}) = K_{Sv\mu} + 10\alpha_{Sv\mu}\log_{10}(d) \quad (6\text{-}2)$$

where d is the distance between the terminal UE and the base station SBS.

The probability $P_{tvr}$ in the expression (4) is then given by:

$$P_{tvr} = P_{tv}P_{vr} \quad (7)$$

where $P_{tv}$ is given by one of the expressions (4-1) to (4-4) and $P_{vr}$ is given by one of the expressions (5-1) to (5-2).

In the step 230, by using the principles of stochastic geometry, such as presented in the article by H. ElSawy et al. entitled "Stochastic geometry for modeling, analysis and design of multi-tier and cognitive cellular wireless networks: a survey" published in IEEE Corn. Surveys & Tutorials, vol. 15, No. 3, 2013, pp. 996-1019, the conditional coverage probability $P(\text{SINR} > \gamma | t, v, r)$ in the sub-6 GHz band (i.e. $r = \mu$) is calculated:

$$P(\text{SINR} > \gamma | t, v, \mu) = \int_0^\infty \exp\left(-\gamma\sigma_{N,\mu}^2 x - \sum_{t',v'} A_{t'v'}(\gamma, x)\right)\hat{f}_{\xi t v \mu 1}(x)dx \quad (8)$$

where $$A_{t'v'} = \int_{l_{t'}}^\infty \frac{\gamma x}{y + \gamma x}\Lambda'_{t'v'\mu}(y)dy \quad \forall t' \in \{M, S\}, v' \in \{L, N\}$$

with $l_{t'} = x/Q_T$ if $t' = t$; $l_{t'} = Q_T x$ if $t = M$ and $t' = S$; $l_{t'} = x/Q_T$ if $t = S$ and $t' = M$, $\sigma_{N,\mu}^2$ is the power of the noise in the sub-6 GHz band and where $\hat{f}_{\xi t v \mu 1}(x)$ represents the probability density (pdf) of the distance of the base station of the strongest power received from tier t, of visibility v, in the sub-6 GHz band, and finally where $\Lambda'_{t'v'\mu}$ represents the number of points of the Poisson process linked to the base stations MBS ($t'=M$) resp. SBS ($t'=S$) in the sub-6 GHz band.

Similarly, the conditional coverage probability $P(\text{SINR} > \gamma | t, v, r)$ is calculated in the millimeter band ($t = S$, $r = M$) by means of:

$$P(SINR > \gamma \mid S, v, m) = \int_0^\infty \exp\left(-\frac{\gamma \sigma_{N,m}^2 x}{G_0} - B_1(\gamma, x) - B_2(\gamma, x)\right) \hat{f}_{\xi S v m 1}(x) dx \quad (9)$$

with $$B_1(\gamma, x) = \sum_{k=1}^{4} \left(-b_k \int_x^\infty \frac{a_k \gamma x}{y + a_k \gamma x} \Lambda'_{Svm}(y) dy\right) \text{ and}$$

$$B_2(\gamma, x) = \sum_{k=1}^{4} \left(-b_k \int_x^\infty \frac{a_k \gamma x}{y + a_k \gamma x} \Lambda'_{Sv'm}(y) dy\right)$$

where $\sigma_{N,m}^2$ is the power of the noise in the millimeter band, $\hat{f}_{\xi S v m 1}(x)$ represents the probability density (pdf) of the distance of the base station SBS of the strongest power (t=S), with a visibility v, in the millimeter band, and finally where $\Lambda'_{Svm}$ represents the number of points of the Poisson process linked to the base stations SBS in the millimeter band.

The antennas of the base stations SBS in the millimeter band are assumed to be directional (for example by means of a formation of a beam) with a main lobe corresponding to a gain $G_h^{SBS}$ and an angular width band $\theta_h^{SBS}$ and secondary lobes corresponding to a gain $G_l^{SBS}$ and an angular width $\theta_l^{SBS} = 2\pi - \theta_h^{SBS}$. A detailed description of the model of the antennas can be found in the aforementioned article by T. Bai et al. Likewise, the antenna of the terminal UE in the millimeter band is assumed to be directional, with a main lobe of gain $G_h^{UE}$ and of angular width $\theta_h^{UE}$ and secondary lobes corresponding to a gain $G_l^{UE}$ and an angular width $\theta_l^{UE} = 2\pi - \theta_h^{UE}$.

The summing on k=1, . . . , 4 corresponds to the four overlapping configurations of lobes between the base station SBS assumed to be associated with the terminal UE and the terminal UE itself. The coefficients $a_k$ and $b_k$ are given by the table:

| k | 1 | 2 | 3 | 4 |
|---|---|---|---|---|
| $a_k$ | $G_h^{UE} G_h^{SBS}$ | $G_h^{UE} G_l^{SBS}$ | $G_l^{UE} G_h^{SBS}$ | $G_l^{UE} G_l^{SBS}$ |
| $b_k$ | $\frac{\theta_h^{UE}}{2\pi} \cdot \frac{\theta_h^{SBS}}{2\pi}$ | $\frac{\theta_h^{UE}}{2\pi} \cdot \frac{\theta_l^{SBS}}{2\pi}$ | $\frac{\theta_l^{UE}}{2\pi} \cdot \frac{\theta_h^{SBS}}{2\pi}$ | $\frac{\theta_l^{UE}}{2\pi} \cdot \frac{\theta_l^{SBS}}{2\pi}$ |

In order to simplify the calculations, the interfering base stations SBS (i.e. separate from the associated base station SBS) are assumed to have a main lobe with an arbitrary orientation with respect to the main lobe of the terminal.

In the step 240 the coverage probability is calculated by means of the expression (3), in other words:

$$P_c(\gamma) = \sum_{\substack{t \in \{M,S\} \\ v \in \{L,N\}}} P(SINR > \gamma \mid t, v, \mu) P_{tv} P_{v\mu} + \sum_{v \in \{L,N\}} P(SINR > \gamma \mid S, v, m) P_{Sv} P_{vm} \quad (10)$$

where the conditional probabilities of SINR $P(SINR > \gamma \mid t,v,\mu)$ and $P(SINR > \gamma \mid S,v,m)$ were respectively calculated in the step 230.

It will be understood that the coverage probability $P_c(\gamma)$ depends on the parameters of the network, such as the deployment density of the macrocells and of the microcells, the transmitting powers of the stations MBSs and SBSs, the antenna gain $G_0$, the bias values $Q_T$ and $Q_R$. With all of the parameters of the network being equal, the coverage probability can be considered as a function of $G_0$, $Q_T$ and $Q_R$:

$$P_c(\gamma) = F(G_0, Q_T, Q_R) \quad (11)$$

In the step 250, for a given antenna gain $G_0$, i.e. in practice for a given antenna gain of the terminal UE in the millimeter band (with the antenna gain of the station SBS assumed to be fixed), the pair of bias values $(Q_T^{opt}, Q_R^{opt})$ that maximises the coverage probability is sought, i.e.:

$$(Q_T^{opt}, Q_R^{opt}) = \underset{\substack{Q_T \in S_{QT} \\ Q_R \in S_{QR}}}{\operatorname{argmax}} (F(G_0, Q_T, Q_R)) \quad (12)$$

where $S_{QT}$ and $S_{QR}$ are respectively the possible sets of bias values $Q_T$ and $Q_R$. In what follows $F^*(G_0) = F(G_0, Q_T^{opt}, Q_R^{opt})$ shall denote the coverage probability obtained for the optimal bias pair $(Q_T^{opt}, Q_R^{opt})$.

The searching in 250 of the optimum pair $(Q_T^{opt}, Q_R^{opt})$ on $S_{QT} \times S_{QR}$ can be carried out according to different alternatives as explained hereinafter.

Figure 3:
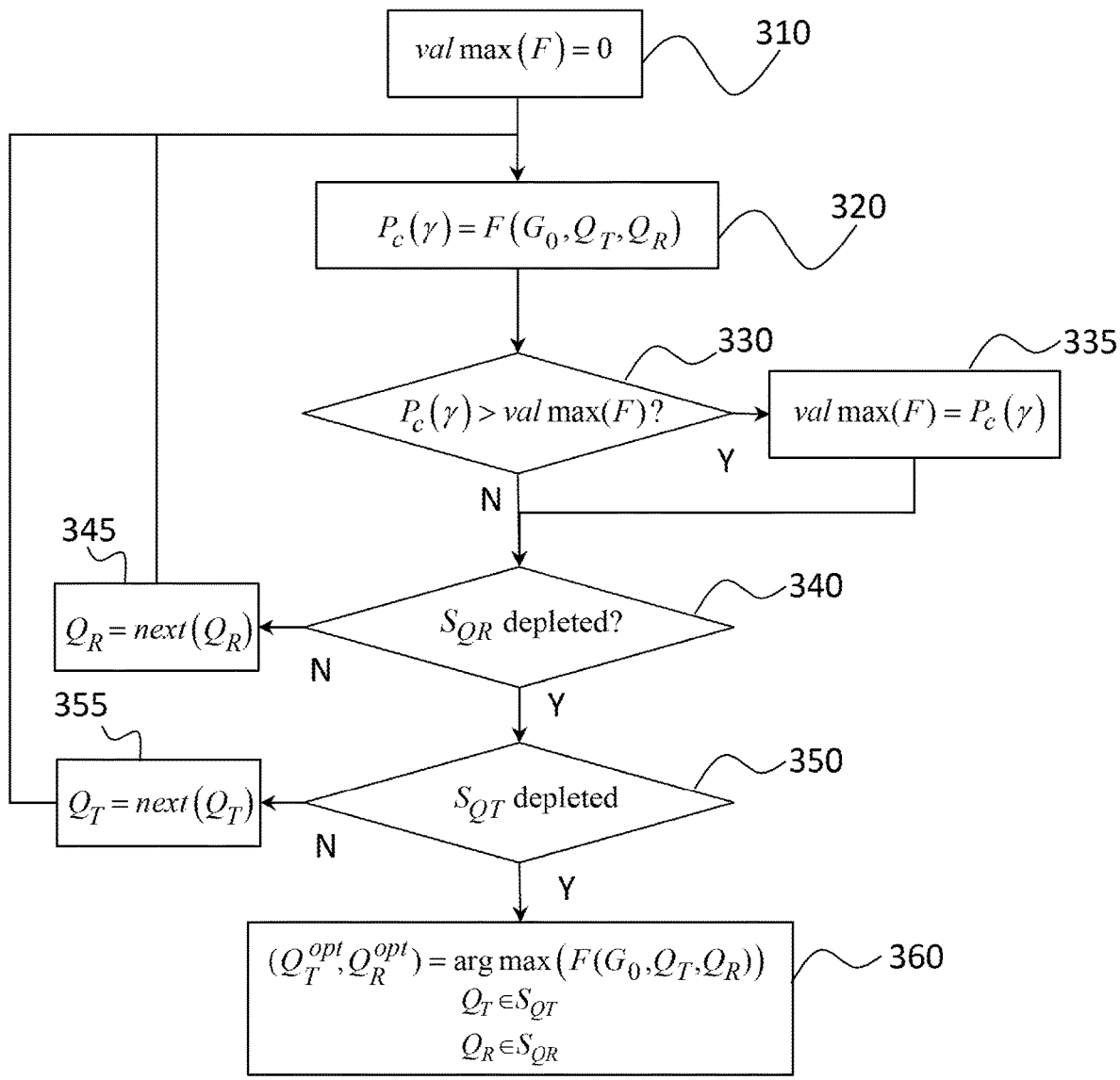
FIG. 3 diagrammatically shows the flowchart of a first alternative for searching an optimum pair of bias values in a step of the FIG. 2.

FIG. 3 diagrammatically shows the flowchart of a first alternative for searching the optimum pair $(Q_T^{opt}, Q_R^{opt})$.

This first alternative consists in a brute force search in the Cartesian product $S_{QT} \times S_{QR}$, in other words this search is carried out by means of a double iteration loop on the elements $Q_T$ and $Q_R$ of $S_{QT}$ and $S_{QR}$. The sets $S_{QT}$ and $S_{QR}$ are in practice intervals of discrete values.

The coverage probability $P_c(\gamma) = F(G_0, Q_T, Q_R)$ is calculated in 320 and it is compared with the maximum value valmax (F) in 330, with the latter initialised beforehand to 0 in the step 310. If the coverage probability calculated as such satisfies $P_c(\gamma) > valmax(F)$ in 330, the maximum value is updated with this probability in 335. In any case, the search is continued until a full sweep of $S_{QT} \times S_{QR}$ (340, 350) by checking if there are still pairs of elements $(Q_T, Q_R)$ to be tested. In the affirmative, we move to the following threshold value of $Q_T$ (355) or of $Q_R$ (345), according to the case. In the negative, this is terminated in 360, by recovering the optimum thresholds values $(Q_T^{opt}, Q_R^{opt})$ corresponding to the maximum of $F(G_0, Q_T, Q_R)$.

Figure 4:
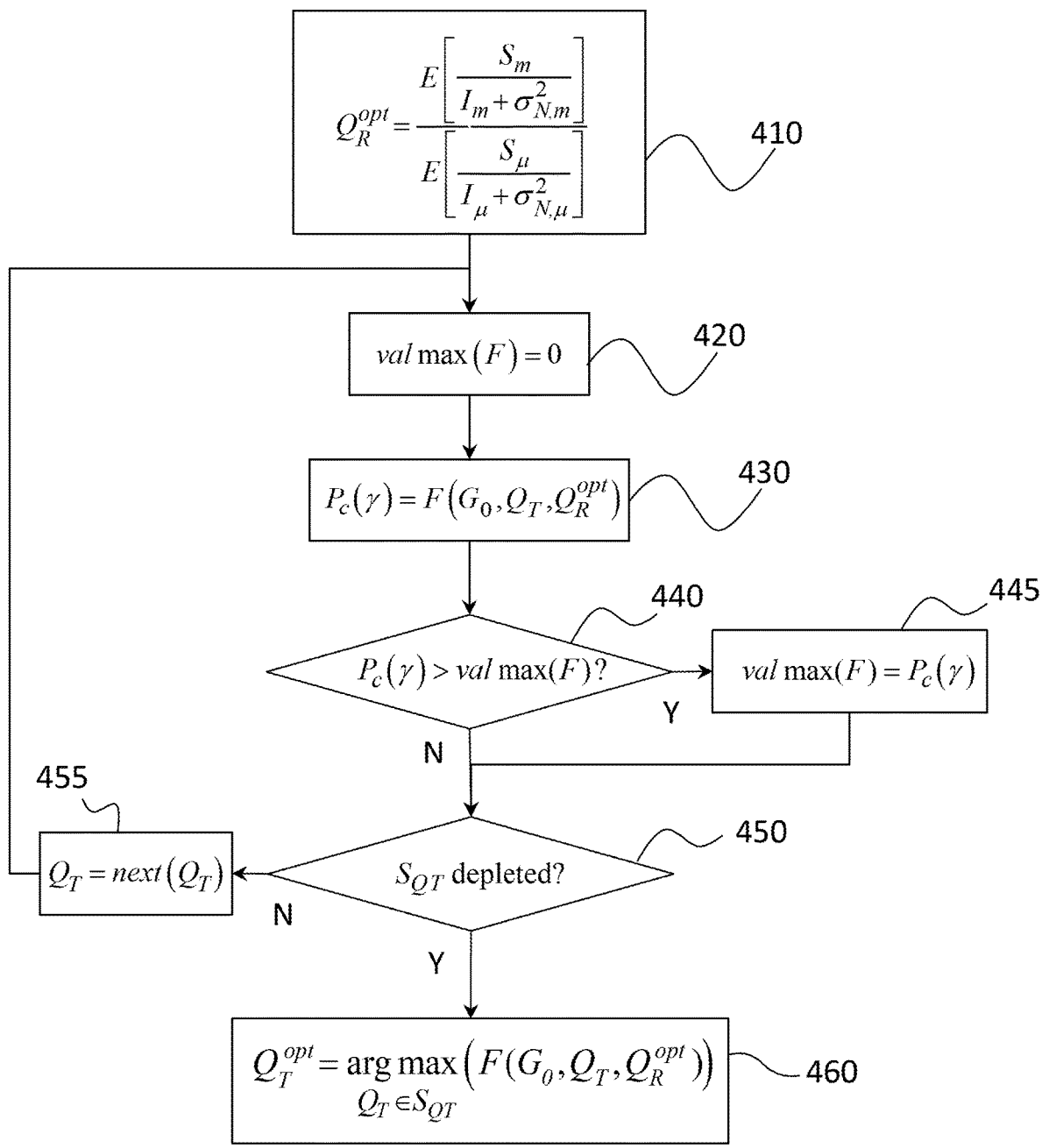
FIG. 4 diagrammatically shows the flowchart of a second alternative for searching an optimum pair of bias values in a step of the FIG. 2.

The FIG. 4 diagrammatically shows the flowchart of a second alternative for searching the optimum pair $(Q_T^{opt}, Q_R^{opt})$.

This second alternative can be used if the brute force search is too complex, for example if the cardinal of the set $S_{QT} \times S_{QR}$ is too high.

In this case, in a first step, in the step 410, an optimum value of the bias calculated, according to the following heuristic formula:

$$Q_R^{opt} = \frac{E\left[\frac{S_m}{I_m + \sigma_{N,m}^2}\right]}{E\left[\frac{S_\mu}{I_\mu + \sigma_{N,\mu}^2}\right]} \quad (13)$$

where E[.] represents the mathematical expectation taken on all of the possible relative positions of the terminal with respect to the base stations of the network, $$\frac{S_m}{I_m + \sigma_{N,m}^2}$$

represents the SINR on the terminal in the millimeter band and $$\frac{S_\mu}{I_\mu + \sigma_{N,\mu}^2}$$

the SINR on the terminal in the sub-6 GHz band. $I_m$ represents the sum of the interferences generated in the millimeter band by the base stations SBSs (in LOS and NLOS). Likewise, $I_\mu$ represents the sum of the interferences generated in the sub-6 GHz band by the base stations MBSs and SBSs (in LOS and NLOS).

As soon as the optimum value $Q_R^{opt}$ is obtained, a search for the optimum value $Q_T^{opt}$ can be carried out, via brute force, according to a single dimension:

$$Q_T^{opt} = \underset{Q_T \in S_{Q_T}}{\operatorname{argmax}}(F(G_0, Q_T, Q_R^{opt})) \quad (14)$$

To do this, in 420, a value valmax(F) is initialised to zero and we enter an iteration loop where an element of $S_{Q_T}$ is selected. At each iteration, in 430 the coverage probability $P_c(\gamma)=F(G_0,Q_T,Q_R^{opt})$ is calculated and it is compared with the current value valmax(F) in 440. If the coverage probability thus calculated is such that $P_c(\gamma)>$valmax(F), the maximum value is updated with this probability in 445. In any case, it is checked in 450 if there are other values of $Q_T$ to be tested. In the affirmative, we return to the step 455. Otherwise, the search is terminated in 460 by recovering the optimum threshold values $Q_T^{opt}$ corresponding to the maximum of $F(G_0,Q_T,Q_R^{opt})$.

A third alternative (not shown) for searching for the optimum bias pair consists in a simplification of the second alternative in the particular case where the base stations SBSs transmit only in the millimeter band. In this case, it can be shown that the coverage probability $F(G_0,Q_T,Q_R)$ and in particular $F(G_0,Q_T,Q_R^{opt})$ is convex in relation to $Q_T$. The value $Q_T^{opt}$ can then be obtained by the method of the gradient.

The method for distributing the load in a heterogeneous network with multi radio access technology such as described hereinabove makes it possible to obtain an optimum distribution of the load in terms of SINR, on the average for the different terminals UEs of the network. However, the operator can wish that certain terminals UEs be handled by the stations SBSs in the millimeter band in order to relieve the sub-6 GHz band, without however derogating from the criterion of optimality in terms of SINR for the association of the terminals in question.

According to a second embodiment of the invention, optionally, after the distribution of the load according to the first embodiment, a modification is carried out in this distribution in favour of the millimeter band.

To do this, a critical distance, $d_{CL}$, is introduced from the terminal UE that is sought to have handled by a base station SBS in the millimeter band. This critical distance defines a disc around the terminal in question. If there is a base station SBS and only one in this disc, the user will be associated with this base station in the millimeter band.

This critical distance is given by:

$$d_{CL} = \left(\frac{K_{SLm} \cdot P_{SLm}}{K_{SL\mu} \cdot P_{SL\mu}} G_0\right)^{\frac{1}{\alpha_{SLm} - \alpha_{SL\mu}}} \quad (15)$$

where $K_{SLm}$ and $K_{SL\mu}$ are respectively the path loss constants for the millimeter band and for the sub-6 GHz band in the case of a direct line propagation path (LOS), $P_{SLm}$ and $P_{SL\mu}$ are the powers transmitted by the SBS respectively in the millimeter band and in the sub-6 GHz band and $\alpha_{SLm}$ and $\alpha_{SL\mu}$ are respectively the path loss exponents for the millimeter band and for the sub-6 GHz band on this path.

It is understood that, if a base station SBS is located in a disc of radius $d_{CL}$ around the terminal UE, the power of the signal received in the millimeter band is greater than that of the signal received in the sub-6 GHz band. Furthermore, in that the other stations SBS are outside of this zone, the level of interference in the sub-6 GHz band (coming from the other stations SBSs or from stations MBSs) is higher than in the millimeter band. This results in that the level of SINR in the millimeter band is necessarily higher than in the sub-6 GHz band and, consequently, than the terminal will be associated with the base station SBS in the millimeter band.

If d denotes the distance of the terminal UE with the base station which serves it in the sub-6 GHz band, it is sufficient then for the operator to request that the terminal modify its receiving antenna gain (for example by modifying the formation of the beam by the antenna network of the terminal) in such a way that $d_{CL}=d$, i.e.:

$$G_0^{\textit{offload}} = \left(\frac{K_{SL\mu} \cdot P_{SL\mu}}{K_{SLm} \cdot P_{SLm}}\right) d^{(\alpha_{SLm}-\alpha_{SL\mu})} \quad (16)$$

or, if it is recalled that the gain $G_0$ is the product of the receiving antenna gain of the terminal $G_{RX,m}^{UE}$ in the millimeter band and of the transmitting antenna gain of the base station SBS in this band, $G_{TX,m}^{SBS}$:

$$G_{RX,m}^{UE} = \frac{1}{G_{TX,m}^{SBS}} \left(\frac{K_{SL\mu} \cdot P_{SL\mu}}{K_{SLm} \cdot P_{SLm}}\right) d^{(\alpha_{SLm}-\alpha_{SL\mu})} \quad (17)$$

The expression (17) is valid only in the hypothesis supra where the transmitting antennas (of the base station SBS) and of receiving (of the terminal UE) are omnidirectional in the sub-6 GHz band (antenna gain equal to 1 in this band). If this hypothesis does not apply and if we note respectively $G_{RX,\mu}^{UE}$ and $G_{TX,\mu}^{SBS}$ the receiving antenna gains of the terminal UE and of the transmitting antenna of the base station SBS in the sub-6 GHz band, the expression (17) becomes:

$$G_{RX,m}^{UE} = \frac{G_{RX,\mu}^{UE} G_{TX,\mu}^{SBS}}{G_{TX,m}^{SBS}} \left(\frac{K_{SL\mu} \cdot P_{SL\mu}}{K_{SLm} \cdot P_{SLm}}\right) d^{(\alpha_{SLm}-\alpha_{SL\mu})} \quad (18)$$

in which case it will be possible for the operator to request that the terminal UE modify $G_{RX,m}^{UE}$ and/or $G_{RX,\mu}^{UE}$ in such a way that the condition (18) is met.

APPENDIX $$W_1 = \frac{1 - e^{-(K_1+1)t_1}}{1+K_1} +$$

$$\exp(-\pi\lambda_S d_S^2)\left[\exp\left(-\Lambda'_{ML\mu}\left(0, \frac{d_S^{\alpha_{SL\mu}}}{Q_T K_{SL\mu} P_S}\right)\right) - \exp(-\pi\lambda_M d_M^2)\right]$$

$$W_2 = \exp(-\pi\lambda_S d_S^2)\frac{e^{-(K_2+1)t_2}}{1+K_2} \text{ with}$$

$$\Lambda'_{ML\mu}\left(0, \frac{d_S^{\alpha_{SL\mu}}}{Q_T K_{SL\mu} P_S}\right) =$$

$$\begin{cases} \pi\lambda_M (K_{ML\mu} P_M)^{\frac{2}{\alpha_{ML\mu}}} \left(\frac{d_S^{\alpha_{SL\mu}}}{Q_T K_{SL\mu} P_S}\right)^{\frac{2}{\alpha_{ML\mu}}}, & \text{if } \frac{d_S^{\alpha_{SL\mu}}}{Q_T K_{SL\mu} P_S} < \frac{d_M^{\alpha_{ML\mu}}}{K_{ML\mu} P_M} \\ \pi\lambda_M d_M^2, & \text{if } \frac{d_S^{\alpha_{SL\mu}}}{Q_T K_{SL\mu} P_S} > \frac{d_M^{\alpha_{ML\mu}}}{K_{ML\mu} P_M} \end{cases}$$

$$K_1 = \pi\lambda_S \left(\frac{K_{SL\mu} P_S Q_T}{K_{ML\mu} P_M}\right)^{\frac{2}{\alpha_{SL\mu}}} (\pi\lambda_M)^{-\frac{\alpha_{ML\mu}}{\alpha_{SL\mu}}} \text{ and}$$

$$t_1 = \pi\lambda_M (K_{ML\mu} P_M)^{\frac{2}{\alpha_{ML\mu}}} \left(\frac{d_S^{\alpha_{SL\mu}}}{Q_T K_{SL\mu} P_S}\right)^{\frac{2}{\alpha_{ML\mu}}}$$

$$K_2 = \pi\lambda_S \left(\frac{K_{SN\mu} P_S Q_T}{K_{MN\mu} P_M}\right)^{\frac{2}{\alpha_{SN\mu}}} (\pi\lambda_M)^{-\frac{\alpha_{MN\mu}}{\alpha_{SN\mu}}} \text{ and}$$

$$t_2 = \pi\lambda_M d_M^2 (K_{MN\mu} P_M)^{\frac{2}{\alpha_{ML\mu}}}$$

The invention claimed is:

1. A method for distributing traffic load in a multi radio access technology heterogeneous network, the network comprising macrocells served by first base stations of a first tier of the network, each being referred to as a MBS, operating in a first frequency band, and minicells served by second base stations of a second tier of the network, each being referred to as a SBS, configured to operate in the first frequency band and in a second frequency band, separate from the first frequency band, wherein:

coverage parameters of the network are acquired or measured, using the coverage parameters of the network, an optimum pair of bias values $(Q_T^{opt}, Q_R^{opt})$ is determined that maximises a coverage probability, $P_c(\gamma)$, defined as a probability that a signal to noise and interference ratio on a terminal is on average greater than a predetermined threshold ($\gamma$) in a deployment zone of the network, a first base station MBS is associated with the terminal, if a strongest power received from the first base station MBS in the first frequency band is greater than a strongest power received from a second base station SBS in the same frequency band, corrected by a first bias value $(Q_T^{opt})$ of the optimum pair of bias values $(Q_T^{opt}, Q_R^{opt})$, the association then being carried out in the first frequency band, and otherwise, the second base station SBS of the strongest power received by the terminal in the first frequency band is associated with the terminal, the association being carried out in the first frequency band if the strongest power is greater than a power received by the terminal in the second frequency band, corrected by a second bias value $(Q_R^{opt})$ of the optimum pair of bias values $(Q_T^{opt}, Q_R^{opt})$, and the association being carried out in the second frequency band in the opposite case.

2. The method for distributing traffic load according to claim 1, wherein the first frequency band is a sub-6 GHz band from 0.7 GHz to 6 GHz, and the second frequency band is a millimeter band from 25 GHz to 300 GHz.

3. The method for distributing traffic load according to claim 2, wherein the coverage probability, $P_c(\gamma)$, is calculated from $$P_c(\gamma) = \sum_{\substack{t \in \{M,S\} \\ v \in \{L,N\} \\ r \in \{\mu,m\}}} P(SINR > \gamma | t, v, r) P_{tvr},$$

where $P_{tvr}$ is
a probability of association of the terminal with a given base station of tier $t \in \{M,S\}$ where M designates the first tier of the network and S designates the second tier of the network, in conditions of visibility $v \in \{L,N\}$ where L designates a state of visibility LOS and N designates a state of visibility NLOS, and in frequency band $r \in \{\mu,m\}$ where $\mu$ designates the sub-6 GHz band and m designates the millimeter band, and where $P(SINR > \gamma | t, v, r)$ is a conditional probability that the signal to noise and interference ratio on the terminal exceeds the predetermined threshold, $\gamma$.

4. The method for distributing traffic load according to claim 3, wherein the probability $P_{tvr}$ of association of the terminal with the given base station of tier $t \in \{M,S\}$, in conditions of visibility $v \in \{L, N\}$ and in frequency band $r \in \{\mu,m\}$ is calculated with $P_{tvr} = P_{tv} P_{vr}$, where $P_{tv}$ is a probability of association of the terminal with the given base station of tier $t \in \{M,S\}$, in conditions of visibility $v \in \{L,N\}$ and $P_{vr}$ is a probability of association of the terminal with a second base station SBS of visibility $P_{vr}$ in the frequency band r.

5. The method for distributing traffic load according to claim 4, wherein the probability $P_{tv}$ is calculated with:

$$P_{ML} = W_1 \exp(-\pi\lambda_M d_M^2)\exp(-\pi\lambda_S d_S^2) + \exp(-\pi\lambda_M d_M^2)(1-\exp(-\pi\lambda_S d_S^2))$$

for an association with a first base station MBS in a state of visibility LOS, $$P_{MN} = W_2(1-\exp(-\pi\lambda_M d_M^2))(1-\exp(-\pi\lambda_S d_S^2))$$

for an association with a first base station MBS in a state of visibility NLOS, $$P_{SL} = (1-W_1)\exp(-\pi\lambda_M d_M^2)\exp(-\pi\lambda_S d_S^2) + \exp(-\pi\lambda_S d_S^2)(1-\exp(-\pi\lambda_M d_M^2))$$

for an association with a second base station SBS in a state of visibility LOS, and $$P_{SN} = (1-W_2)(1-\exp(-\pi\lambda_M d_M^2))(1-\exp(-\pi\lambda_S d_S^2))$$

for an association with a second base station SBS in a state of visibility NLOS, $d_M$ is a characteristic distance beyond which a first base station MBS is in a state of visibility LOS and beyond which it is in a state of visibility NLOS, $d_s$ is a characteristic distance beyond which a second base station SBS is in a state of visibility LOS and beyond which it is in a state of visibility NLOS, $\lambda_M$ and $\lambda_S$ are intensities of Poisson distributions giving respectively a spatial distribution of the first base stations MBS and that of the second base stations SBS, $W_1$ and $W_2$, are coefficients that depend on transmitting powers of the first base stations MBS and the second base stations SBS as well as a first bias value $Q_T$, used for selection of the tier t of the given base station.

6. The method for distributing traffic load according to claim 4, wherein the probability $P_{v\mu}$ is calculated by $$P_{v\mu} = \exp\left(-\pi\lambda_S \left(\frac{K_{Svm}G_0Q_R}{K_{Sv\mu}}\right)^{\frac{2}{\alpha_{Svm}-\alpha_{SV\mu}}}\right)$$

for an association with a second base station SBS in the sub-6 GHz band and $P_{vm}=1-P_{v\mu}$ for an association with a second base station SBS in the millimeter band, where $K_{Svm}$ and $K_{Sv\mu}$ are respectively the respective path loss constants for the millimeter band and the sub-6 GHz band in a state of visibility v, $\alpha_{Svm}$ and $\alpha_{Sv\mu}$ are the respective path loss exponents for the millimeter band and the sub-6 GHz band in a state of visibility v, $G_0$ is the antenna gain, $\lambda_S$, is the intensity of a Poisson distribution giving a spatial distribution of the second base stations SBS, and $Q_R$ is a second bias value used for selection of the frequency band in the association of the terminal with a second base station SBS.

7. The method for distributing traffic load according to claim 3, wherein the conditional probability $P(SINR>\gamma|t, v, \mu)$ that the signal to noise and interference ratio on the terminal exceeds the predetermined threshold, knowing that the terminal is associated with the given base station of tier t, of state of visibility v, operating in the sub-6 GHz band, is obtained from the probability density of the given base station of tier t, of state of visibility v and of the strongest power received, as well as a measurement of power received from the given base station.

8. The method for distributing traffic load according to claim 3, wherein the conditional probability $P(SINR>\lambda|S, v, m)$ that the signal to noise and interference ratio on the terminal exceeds the predetermined threshold, knowing that the terminal is associated with a second base station SBS, of state of visibility v, operating in the millimeter band, is obtained from the probability density of the second base station SBS of the strongest power received from the second base station SBS, from antenna gains of the terminal and from the second base station SBS as well as from angular widths of main lobes of radiation of the terminal and of the second base station SBS.

9. The method for distributing traffic load according to claim 3, wherein the coverage probability is calculated as a function $P_c(\gamma)=F(G_0, Q_T, Q_R)$, where $G_0$ is the antenna gain, a product of the receiving antenna gain of the terminal and of a transmitting antenna gain of a second station SBS, and $Q_T$, $Q_R$ are the first and the second bias values.

10. The method for distributing traffic load according to claim 9, wherein the optimum pair of bias values ($Q_T^{opt}$, $Q_R^{opt}$) is obtained by systematically sweeping a Cartesian product $S_{QT}\times S_{QR}$ where $S_{QT}$ is a set of first possible bias values and $S_{QR}$ is a set of second possible bias values, and by searching for a pair of first and second bias values that maximises the function $F(G_0, Q_T, Q_R)$.

11. The method for distributing traffic load according to claim 9, wherein the optimum pair of bias values ($Q_T^{opt}$, $Q_R^{opt}$) is obtained by calculating $$Q_R^{opt} = \frac{E\left[\frac{S_m}{I_m + \sigma_{N,m}^2}\right]}{E\left[\frac{S_\mu}{I_\mu + \sigma_{N,\mu}^2}\right]}, \text{ where } \frac{S_m}{I_m + \sigma_{N,m}^2}$$

is the signal to noise ratio on the terminal in the $$\frac{S_\mu}{I_\mu + \sigma_{N,\mu}^2}$$

millimeter band, is the signal to noise ratio on the terminal in the sub-6 GHz band, and E is the mathematical expectation taken over all possible positions of the terminal with respect to base stations of the network.

12. The method for distributing traffic load according to claim 9, wherein the second base stations SBS operate only in the millimeter band, and the optimum pair of bias values ($Q_T^{opt}$, $Q_R^{opt}$) is obtained by applying a gradient descent to the function $F(G_0, Q_T, Q_R)$.

13. The method for distributing traffic load according to claim 1, wherein, in order to transfer a terminal associated with a second base station SBS, from the sub-6 GHz band to the millimeter band, an antenna gain of the terminal is increased, $G_{RX,m}^{UE}$, in the millimeter band, such that $$G_{RX,m}^{UE} = \frac{G_{RX,\mu}^{UE} G_{TX,\mu}^{SBS}}{G_{TX,m}^{SBS}}\left(\frac{K_{SL\mu} \cdot P_{SL\mu}}{K_{SLm} \cdot P_{SLm}}\right)d^{(\alpha_{SLm}-\alpha_{SL\mu})},$$

where $G_{RX,\mu}^{UE}$ is the antenna gain of the terminal in the sub-6 GHz band $G_{TX,\mu}^{SBS}$ and $G_{TX,m}^{SBS}$ are the antenna gains of the second base station SBS associated with the terminal, respectively in the sub-6 GHz band and in the millimeter band, $K_{SL\mu}$ and $K_{SLm}$ are respectively the path loss constants in the sub-6 GHz band and in the millimeter band, $P_{SL\mu}$ and $P_{SLm}$ are respectively the powers transmitted by the second base station SBS in the sub-6 GHz band and in the millimeter band, $\alpha_{SL\mu}$ and $\alpha_{SLm}$ are respectively the path loss exponents in the sub-6 GHz band and in the millimeter band, for a direct propagation path between the second base station SBS associated with the terminal, and d is the distance between the second base station SBS and the terminal.

* * * * *